(12) United States Patent
Iwamoto et al.

(10) Patent No.: US 6,806,004 B1
(45) Date of Patent: Oct. 19, 2004

(54) POLYMERIC SOLID ELECTROLYTE AND LITHIUM SECONDARY CELL USING THE SAME

(75) Inventors: Kazuya Iwamoto, Osaka (JP); Takafumi Oura, Osaka (JP); Shinji Nakanishi, Osaka (JP); Atsushi Ueda, Osaka (JP); Hizuru Koshina, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 397 days.

(21) Appl. No.: 09/807,124
(22) PCT Filed: Jul. 4, 2000
(86) PCT No.: PCT/JP00/04419
§ 371 (c)(1),
(2), (4) Date: Jul. 30, 2001
(87) PCT Pub. No.: WO01/11706
PCT Pub. Date: Feb. 15, 2001

(30) Foreign Application Priority Data

Aug. 6, 1999 (JP) .......................................... 11-223391

(51) Int. Cl.[7] ............................................. H01M 10/40
(52) U.S. Cl. ....................................... 429/313; 429/314
(58) Field of Search ................................ 429/313, 314; 556/412; 528/33, 38

(56) References Cited

U.S. PATENT DOCUMENTS

| 4,835,238 A | * 5/1989 | Burns ........................... 528/28 |
| 5,419,984 A | 5/1995 | Chaloner-Gill et al. |
| 5,538,812 A | 7/1996 | Lee et al. |
| 5,885,733 A | 3/1999 | Ohsawa et al. |

FOREIGN PATENT DOCUMENTS

| JP | 4-306560 | 10/1992 |
| JP | 07082450 | 3/1995 |
| JP | 8-78053 | 3/1996 |
| JP | 9-263637 | * 10/1997 |
| JP | 10204172 | 8/1998 |
| JP | 10-208747 | * 8/1998 |
| JP | 11-502819 | 3/1999 |
| JP | 11154416 | 6/1999 |

OTHER PUBLICATIONS

International search report for PCT/JP00/04419 dated Oct. 10, 2000, published with WO 01/11706, Feb. 15, 2001.

* cited by examiner

Primary Examiner—Jonathan Crepeau
(74) Attorney, Agent, or Firm—RatnerPrestia

(57) ABSTRACT

A polymeric solid electrolyte capable of conducting lithium ions which contains silylamide bonds in its polymer skeleton structure, for example, which is obtained by a method comprising subjecting a mixture of lithium silylamide and an organic compound having at least one carbon—carbon double bond to a polymerization in a dry atmosphere; and a lithium secondary cell using the polymeric solid electrolyte. The polymeric solid electrolyte is a "dry" polymeric solid electrolyte which contains counter ions forming lithium salts with lithium ions in its polymer skeleton structure and thus has a single ion electron conducting system wherein lithium ions alone are mobile ions, and hence has excellent conductivity, and further is easy to produce. The polymeric solid electrolyte can therefore be used for producing a novel lithium secondary cell which is an alternative for conventional lithium cells using an organic solvent and is safe and excellent in the capability of corresponding to a variety of shapes and has a high cell voltage.

8 Claims, 3 Drawing Sheets

POLYMERIC SOLID ELECTROLYTE AND LITHIUM SECONDARY CELL USING THE SAME

This Application is a U.S. National Phase Application of PCT International Application PCT/JP00/04419, filed Jul. 4, 2000.

TECHNICAL FIELD

The present invention relates to improvement in lithium secondary batteries utilizing solid polymer electrolytes.

BACKGROUND ART

Lithium secondary batteries recently utilized as main power sources for mobile communication equipment and portable electronic equipment feature high electromotive force and high energy density. Electrolytes used in these lithium secondary batteries are mostly organic electrolyte solutions, each being made by dissolving a lithium salt such as lithium hexafluorophosphate, lithium tetrafluoroboric acid or the like in an organic solvent such as ethylene carbonate, diethyl carbonate or dimethyl carbonate. However, the electrolyte solution of any of the above-mentioned batteries is rich in organic solvent which is connected with danger of ignition, so that a problem of safety is apprehended at all times under the present circumstances. Moreover, the electrolyte solution, which is liquid, has problems of leakage, freezing, evaporation and the others and is devoid of flexibility in battery shape and difficult to reduce its weight.

Techniques for assembling a battery with a solid electrolyte or the like have been conceived as preferred means to circumvent many of the above-mentioned problems connected with the use of the liquid, organic electrolyte solution. Specifically, the means including the use of such electrolytes as an inorganic solid electrolyte, a "gelled" solid polymer electrolyte and a "dry" solid polymer electrolyte have been actively studied. However, in these means, there reside many problems unique to their respective forms.

For example, such compounds showing excellent ionic conductivity as $Li_3PO_4$—$Li_2S$—$SiS_2$, $Li_3N$ and the like have been found for use as inorganic solid electrolytes. These inorganic solid electrolytes themselves are solid, so that unlike the organic electrolyte solution, such phenomena as leakage, freezing and evaporation cannot possibly occur. However, to function as homogeneous, ion conductive layers with high conductivities, thereby to draw out sufficient functions of lithium secondary batteries utilizing these layers, these materials require such processes as grinding, mixing with active material and extremely elaborate molding, causing difficulties different from the solution types.

As disclosed in Japanese Unexamined Patent Publication Nos. 4-306560 (1992) and 7-82450(1995), there is known, as a "gelled" polymer electrolyte, an electrolyte in which an organic electrolyte solution with a lithium salt dissolved therein is held by a polar polymer such as polyacrylonitrile. In the case of such a "gelled" polyelectrolyte, the electrolyte solution is non-fluidized, so that the danger of leakage has been avoided, and improvement in shape flexibility has been made. However, characteristics of the electrolyte have not outpaced those of the electrolyte solution thus held, and the problem of safety caused by the use of the organic solvent and the problems of freezing and evaporation have not been solved essentially.

On the other hand, there are known, as "dry" polymer electrolytes, a solid electrolyte formed by dissolving a lithium salt in polyethylene oxide, a solid electrolyte disclosed in Japanese Unexamined Patent Publication No. 10-204172 (1998), according to which a lithium salt is dissolved in a polymer skeleton of a crosslinked material of a polyether copolymer, and the like. Since no electrolyte in solution form is present in these "dry" solid polymer electrolytes, the problems of leakage, freezing and evaporation connected with the above-mentioned solution types can be circumvented. Besides, no organic solvent is contained therein, so that there is increased safety. However, any of the above types of "dry" solid polymer electrolytes possesses a decreased cationic transport number because respective counter anions of lithium ions are not immobilized by a polymer chain, thus migrating simultaneously with the lithium ions. In other words, the transport number of cationic lithium decreases, causing rate-determinant mass transfer which problematically results in lack of capability of following high-rate charge-discharge.

To realize a "dry" solid polymer electrolyte excellent in ionic conductivity, it is therefore presumably essential for a polymer to immobilize the counter anions, thereby to improve the cationic transport number of the polymer electrolyte. A solid polymer electrolyte disclosed in Japanese Unexamined Patent Publication No. 11-154416 (1999) is presumably one of the ways of turning the conception of such a single-ion conductive mechanism into reality. According to this publication, the disclosed solid electrolyte is presumably a single-ion conductive material made by linking an N group and such an electron-withdrawing group as $CF_3$, $SO_2CF_3$, F, Cl, Br, I, $SO_3CF_3$, $SO_2F_5$ or $SO_3C_2H_5$ to carbon in the side chain of an isopropylene monomer which forms a polymer, charging a part of the polymer with $N^+$ and then coordinating a mobile $Li^-$ ion thereto to make the lithium ion mobile. However, this single-ion conductive solid polymer electrolyte requires synthesis which is not only complicated but also time-consuming, so that there have been many problems to be solved before it becomes industrially practical.

Accordingly, development of a novel single-ion conductive solid polymer electrolyte which can readily be synthesized and is excellent both in mass productivity and conductivity has been essential for the realization of a lithium secondary battery excellent in safety and shape flexibility.

DISCLOSURE OF THE INVENTION

The present invention proposes, as a concrete means for solving the foregoing problems, a lithium ion conductive solid polymer electrolyte comprising a polymer having silylamide bonds (Si—Na—Si bonds) in a skeleton thereof and the lithium secondary batteries utilizing the same.

The invention of said novel solid polymer electrolyte is based on the discovery that an organic compound comprising a carbon—carbon double bond and a lithium silylamide compound form a lithium ion conductive solid polymer electrolyte when mixed and polymerized. This synthetic material forms a chemical structure in which a functional group having a silylamide bond, which is a counter anion of a lithium ion, is incorporated in a skeletal polymer chain, so that only the lithium ion becomes mobile, thus contributing to charge transfer. Consequently, a single-ion conductive material possessing an increased cationic transport number is presumably formed.

The polymerization reaction between the polymer comprising the double bond and the lithium silylamide compound can be carried out with extreme ease simply by mixing these components and then keeping them dried. In other words, the present invention can provide innovative improvement not only in mass productivity of a solid polymer electrolyte per se but also in battery manufacturing methods including a method comprising the steps of applying a mixed solution of the above-mentioned components to the respective surfaces of electrodes, joining them together and then drying them, a method of utilizing the mixed solution as an ion-conductive binder when making an active material mix.

PREFERRED MODE FOR CARRYING OUT THE INVENTION

A preferred mode for carrying out the present invention is demonstrated hereinafter with reference to the accompanying drawings.

Figure 1:
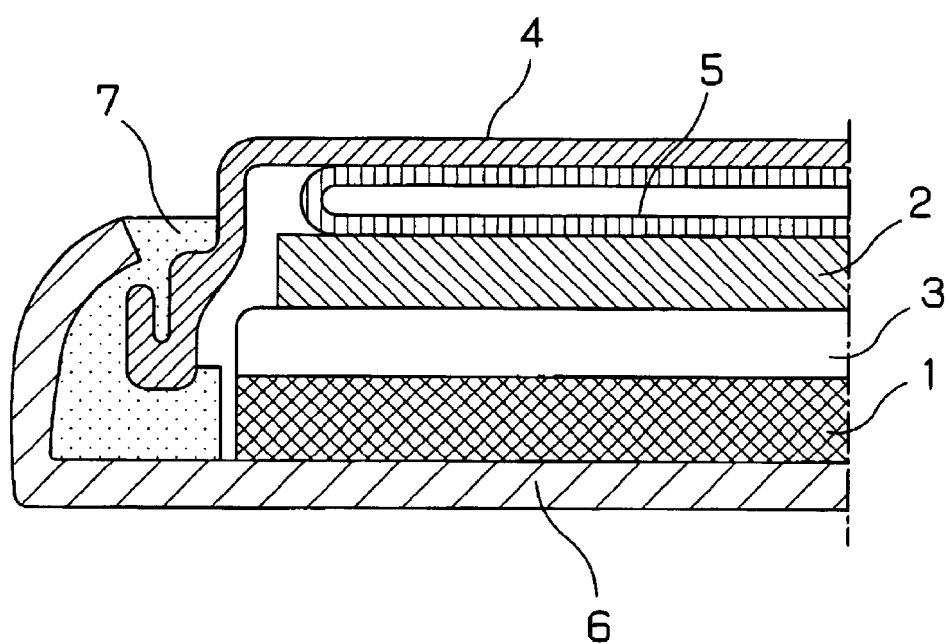
FIG. 1 is a cross sectional view of an example of a lithium secondary battery based on the present invention.

FIG. 1 is a cross sectional view of an example of a button-type lithium secondary battery based on the present invention.

Reference numerals 1, 2, 3, 4, 5, 6, and 7 designate a positive electrode, a negative electrode, a solid electrolyte, a top cover, a springy conductor, a case and a gasket, respectively.

The respective mixes of positive electrode active material and negative electrode active material, each of which is capable of occluding and releasing lithium ions in contact with a solid polymer electrolyte of the present invention, are applied to electrode current collectors, respectively, to form positive electrode 1 and negative electrode 2, respectively. Said negative electrode 2 is pressed by springy conductor 5 provided to cap-shaped top cover 4 also serving as a negative terminal, while positive electrode 1 is pressed by metal case 6 also serving as a positive terminal. Electrolyte 3 can be synthesized separately and then disposed between the positive electrode and the negative electrode, or it can be made by interposing a mixture for the synthesis of the electrolyte between positive electrode 1 and negative electrode 2 and then joining them together to initiate and complete the synthesis.

Subsequently to the completion of the foregoing arrangement, the gasket is placed, and then top cover 4 and case 7 are crimped in the usual way.

A detailed explanation of the primary components is as follows.

First, there is given an explanation of the solid polymer electrolyte of the present invention.

A mixed solution is made by using an organic compound comprising a carbon—carbon double bond and a lithium silylamide compound as materials for the solid polymer electrolyte. Said mixed solution is applied to a flat plate, which allows easy exfoliation of the mixed solution, with a doctor blade, or it is filled into a container having a specified depth, or it is applied to at least one of the positive electrode and the negative electrode, or it is subjected to other processes. Thereafter, the mixed solution is kept under a dry atmosphere for polymerization, thus forming a synthesized ion conductive solid polymer electrolyte.

The molar mixing ratio of the lithium silylamide compound to the organic compound comprising the carbon—carbon double bond can arbitrarily be set, but is preferably 0.5–3 to 1. Also, the dry atmosphere can arbitrarily be set, but is preferably an atmosphere with a dew point of −30° C. for efficient polymerization.

Preferred examples of the compounds having carbon—carbon double bonds that find application in the present invention include methacrylonitrile, acrylonitrile, acrylic acid, methacrylic acid, maleic acid, itaconic acid, vinyl propionic acid, methyl acrylate, ethyl acrylate, normal propyl acrylate, isopropyl acrylate, normal butyl acrylate, methyl methacrylate, ethyl methacrylate, hydroxyethyl methacrylate, vinyl formate; vinyl acetate, butadiene, vinylene carbonate, vinylethylene carbonate and divinylethylene carbonate. Other compounds can also be polymerized provided that they have carbon—carbon double bonds. These compounds can be used singly, or a mixture of two or more of these compounds can be used.

Figure 2:
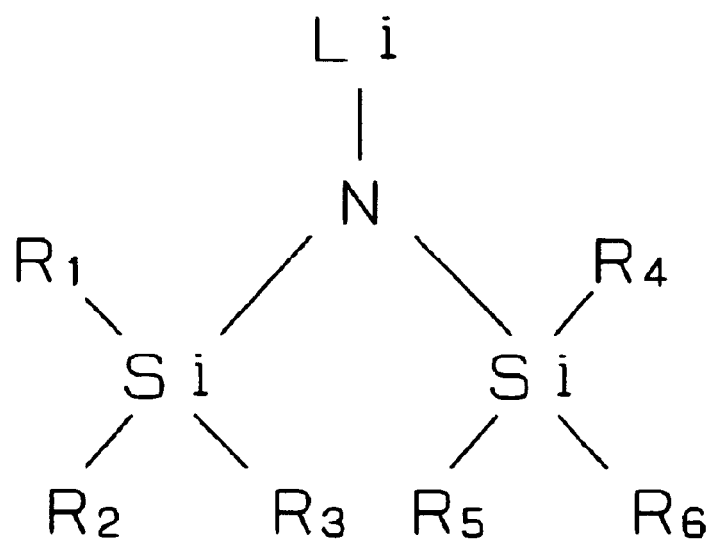
FIG. 2 is a chemical structural formula of a lithium silylamide compound.

Preferred examples of lithium silylamide compounds having Si—N—Si bond forms include lithium bis (trimethylsilyl)amide having a chemical structure, like the one shown in FIG. 2, and lithium bis(triethylsilyl)amide. $R_1$, $R_2$, $R_3$, $R_4$, $R_5$, and $R_6$ are alkyl groups, each having 1 to 4 carbon atoms. These alkyl groups are independent of one another and may all be the same or partially different from one another.

An explanation of respective materials for the positive electrode and the negative electrode is given next. Active material should be capable of occluding and releasing lithium ions and should show a desired potential in an environment where it is in contact with the above-described novel and special solid polymer electrolyte. As a result of a study, active materials used in conventional lithium secondary batteries have been found to be fundamentally applicable to the positive electrode as well as the negative electrode of the present invention.

As the positive electrode active material in particular, a compound containing at least one constituent selected from the group consisting of $Li_xCoO_2$, $Li_xNiO_2$, $Li_xMnO_2$, $Li_xCo_yNi_{1-y}O_2$, $L_xCo_yM_{1-y}O_z$, $Li_xNi_{1-y}O_z$, $Li_xMn_2O_4$, and $Li_xMn_{2-y}M_yO_4$, (wherein M=at least one kind selected from the group consisting of Na, Mg, Sc, Y, Mn, Fe, Co, Ni, Cu, Zn, Al, Cr, Pb, Sb and B, x=0–1.2, y=0–0.9, and z=2.0–2.3) is preferred. Here, the value x represents a material at a point where a mix is made, that is, a lithium-containing composition in the stage prior to the initiation of charge and discharge, and, as a matter of course, it increases and decreases with occlusion and release of the lithium ions in the course of charging and discharging.

Besides the foregoing lithium-containing cobalt oxides, the lithium-containing manganese oxides and the others, transition metal chalcogenide, vanadium oxide, niobium oxide, lithium-containing compounds thereof, a conjugate polymer employing organic conductive material, a Chevrel phase compound and the like can be used as positive electrode active materials. A mixture of two or more of these materials can also be used. The average particle size of the positive electrode active material is not specifically limited, but is preferably in the range of 1 to 30 μm.

The negative electrode active material other of the metal lithium should occlude and release lithium and should show a potential close to the lithium. As a preferred material for the negative electrode, materials containing at least one of the simple substances or the compounds selected from the groups consisting of; carbons decomposed by heat; cokes such as pitch coke, needle coke, petroleum coke; graphites; glassy carbons; materials carbonized by burning and sintering process at proper temperature from organic polymer such as phenol resin and furan resin; carbonaceous materials such as carbon fiber and active carbon; polymer materials such as polyacetylene, polypyrole, polyacene and the id like; and lithium-containing oxides or sulfides of transition metal such as $Li_{4/3}Ti_{5/3}O_4$, or $TiS_2$ and the like can be used.

Of these materials, the carbon materials are suitable for use. For example, graphite having a space of 0.340 nm or less between (002) planes yields high energy density when used. A mixture of one or more of the above-mentioned materials can also be used.

The respective active materials for the positive electrode and the negative electrode are each kneaded with a conductive agent and a binder, thus forming active material mixes, which are then applied to respective current collectors for the positive electrode and the negative electrode, respectively.

As the conductive agent for use in the positive electrode mix, electron conductive material that causes no chemical change at charge-discharge potential of the positive electrode material to be used can find wide use. For example, graphites such as natural graphites (scale graphite and the like), artificial graphite and the like, carbon blacks such as acetylene black, Ketjen black, channel black, furnace black, lamp black, thermal black and the like, conductive fibers such as carbon fiber, metallic fiber and the like, metal powders such as carbon fluoride, copper, nickel, aluminum, silver and the like, conductive whiskers such as zinc oxide, potassium titanate and the like, conductive metal oxides such as titanium oxide and the like, and organic conductive materials such as polyphenylene derivatives and the like can be used singly or by mixture. Of these conductive agents, artificial graphite, acetylene black and nickel powder in particular are preferred.

The amount of conductive agent is not specifically limited, but it is added preferably in an amount ranging from 1 to 50% by weight and more preferably in an amount ranging from 1 to 30% by weight to ensure balance between capacity and performance characteristics in particular. In the case of either carbon or graphite, it is added preferably in an amount ranging from 2 to 15% by weight.

As the conductive agent for use in the negative electrode mix, electron conductive material can find wide use. For example, graphites such as natural graphites including scale graphite and the like, artificial graphite and the like, Ca carbon blacks such as acetylene black, Ketjen black, channel black, furnace black, lamp black, thermal black and the like, conductive fibers such as carbon fiber, metallic fiber and the like, metal powders such as carbon fluoride, copper, nickel and the like, and organic conductive materials such as polyphenylene derivatives and the like can be used singly or by mixture. Of these agents, artificial graphite, acetylene black and carbon fiber in particular are preferred.

The amount of conductive agent is not specifically limited, but it is added preferably in an amount ranging from 1 to 50% by weight and more preferably in an amount ranging from 1 to 30% by weight to ensure compatibility between filling capacity and performance characteristics in particular. Since the carbons themselves have electronic conductivity when used in negative electrode active material layers of the present invention, they function as negative electrodes even without other additional conductive agents.

The respective mixes for the positive electrode and the negative electrode each contain, besides the above-mentioned conductive agents, a binder, a filler, a dispersant, an ion conductive agent and other various additives on an as needed basis.

As the filler, which is a reinforcing material, fibrous material that causes no chemical change in an assembled battery is used. Typically, fibers of olefinic polymers such as polypropylene, polyethylene and the like, and fibers of glass, carbon and the like are used. The amount of filler is not specifically limited, but it is added preferably in an amount ranging from 0 to 30% by weight.

As the ion conductive agent, the mixture, which is unpolymerized or is a prepolymer for the solid polymer electrolyte of the present invention can be used. Other materials can also be used provided that they are non-aqueous and ion conductive.

It is appropriate that the mixture of these materials be kneaded with water or an organic solvent for use as paste. The resultant respective mixes are applied to the positive electrode current collector and the negative electrode current collector, respectively, by the usual method and then dried to form the respective active material layers for positive electrode 1 and negative electrode 2.

As the positive electrode current collector, electron conductive material that causes no chemical change at charge-discharge potential of the positive electrode material to be used can find use. For example, besides stainless steel, aluminum, titanium, carbon, conductive resin and the like, aluminum and stainless steel that are surface treated with carbon or titanium can be used. Aluminum and aluminum alloy are preferred since they are both lightweight and excellent in conductivity.

The surfaces of these materials are oxidized for use and preferably formed with irregularities. The positive electrode current collector can be in the form of a foil, a film, a sheet, a net, a punching metal, a lath sheet, a porous body, a foamed body, a fiber group in molded form, a non-woven fabric in molded form or the like. Its thickness is not specifically limited, but is preferably in the range of 1 to 500 $\mu$m.

The negative electrode current collector should be an electron conductive material that causes no chemical change in an assembled battery. For example, besides stainless steel, nickel, copper, titanium, carbon, conductive resin and the like, copper and stainless steel that are surface treated with carbon, nickel or titanium can be used. Copper and copper alloy are preferred since they have good conductivity and excellent coatability for the negative electrode mix. The surfaces of these materials can be oxidized and formed with irregularities by a surface treatment for use. The negative electrode current collector can take on various shapes such as a foil, a film, a sheet, a net, a punching metal, a lath sheet, a porous body, a foamed body, a fiber group in molded form and the like. Its thickness is not specifically limited, but is preferably in the range of 1 to 500 $\mu$m.

The following example illustrates characteristics and functions of the form of the present invention.

EXAMPLE

Materials for a solid polymer electrolyte of the present invention, that is, 2 mol of ethyl acrylate with a molecular weight of 100.117 and 2 mol of lithium bis(trimethylsilyl) amide with a molecular weight of 167.330 were mixed through agitation for 30 minutes under a dry atmosphere with a dew point of $-30°$ C., thus forming a mixed solution for the synthesis of a solid electrolyte. The thus-obtained mixed solution was poured onto a fluororesin plate and then drawn by a doctor blade to a thickness of 100 $\mu$A. Thereafter, it was polymerized for 1 hour under the dry atmosphere, thus forming a solid polymer electrolyte in the form of a thin film having a thickness of 95 $\mu$A.

The following experiment was conducted for clarity of ionic conductivity of the thus-obtained polymer electrolyte. The solid polymer electrolyte obtained was cut into a 1 cm by 2 cm piece and then put on a glass sheet. Thereafter, conductive carbon paste was applied to each end along the length of the glass sheet to a width of 5 mm to serve as a measuring electrode. With these measuring electrodes, its impedance was measured by the AC impedance method.

As a result of the measurement, a resistance of 284.5 k$\Omega$ was measured. This value is equivalent to $3.7 \times 10^{-4}$ S/cm on a specific conductivity basis. It has thus been confirmed that the foregoing polymer shows excellent ionic conductivity.

Next, for clarity of the functions of a lithium secondary battery using the solid polymer electrolyte of the present invention, the solid polymer electrolyte material described in the above-described example was used to make a lithium secondary battery assembled, like the one shown in FIG. 1. Here, instead of using the thin-film solid electrolyte polymerized for the above-mentioned impedance measurement, the battery was made by the following method.

An active material mix for positive electrode 1 was made by mixing 85% by weight lithium cobaltate powder, 10% by weight carbon powder as a conductive agent and 5% by weight of an ion conductive agent, that is, a mixed solution of ethyl acrylate and lithium bis(trimethylsilyl)amide that was made in the same manner as in the example. This mix was applied to a positive electrode current collector made of aluminum foil and then dried. Thereafter, the mix was rolled out to a specified thickness, thus forming positive electrode 1.

On the other hand, an active material mix for negative electrode 2 was made by mixing 75% by weight artificial graphite, 20% by weight carbon powder as a conductive agent and 5% by weight of an ion conductive agent, that is, a mixed solution of ethyl acrylate and lithium bis(trimethylsilyl)amide that was made in the same manner as in the example. This mixture was applied to a negative electrode current collector made of aluminum foil and then dried. Subsequently, the mix was rolled out, thus forming negative electrode 2.

A mixed solution of ethyl acrylate and lithium bis(trimethylsilyl)amide that was made in the same manner as in the example was applied to the respective surfaces of positive electrode 1 and negative electrode 2 thus obtained and then dried for 20 minutes under a dry atmosphere with a dew point of –30° C. Subsequently, the positive electrode plate and the negative electrode plate were opposed to each other with tackiness remaining, crimped and then dried for another 1 hour under the dry atmosphere for complete polymerization. Thereafter, the thus-obtained battery element comprising the pair of positive electrode 1 and negative electrode 2 was housed in a case, and a coin-type lithium secondary battery, like that of FIG. 1, was thus made. The resultant battery measured 20 mm across and 1.6 mm thick, and a theoretical capacity calculated from the weight of the active material was 20 mAh.

Figure 3:
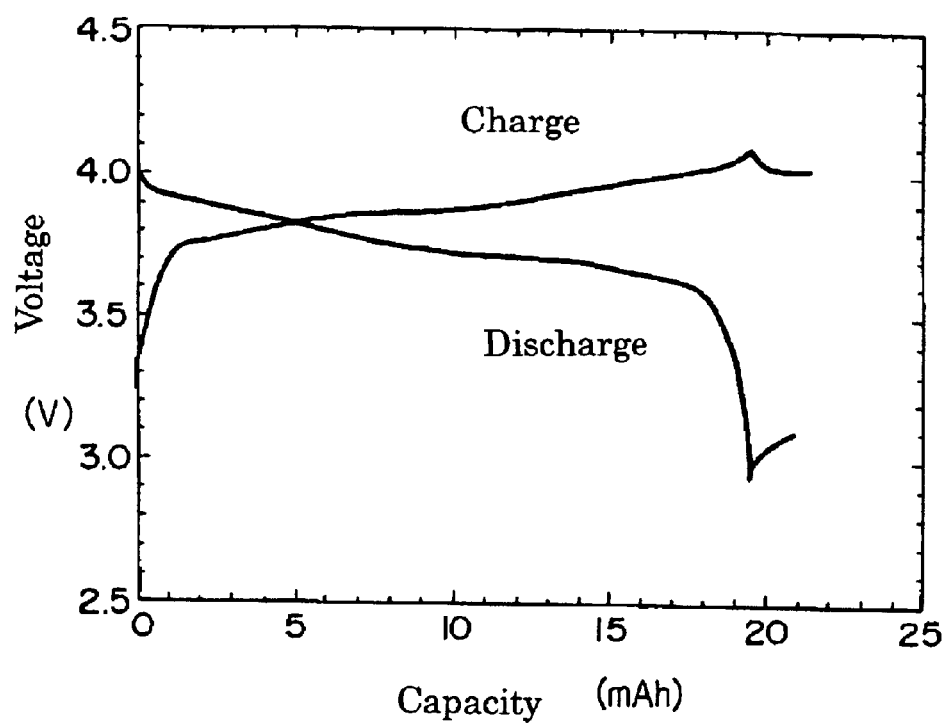
FIG. 3 shows charge-discharge characteristics of the lithium secondary battery of the present invention.

Next, the battery was subjected to a charge-discharge test with a charge-discharge current of 1 mA, a charge end voltage of 4.1 V and a discharge end voltage of 3.0 V. FIG. 3 shows charge-discharge curves as a result of the test. As shown in FIG. 3, it has been confirmed that with a charge-discharge current of 1 mA, a charge-discharge capacity on the order of 20 mAh which is the same as the theoretical capacity can be obtained.

As described above, the solid polymer electrolyte of the present invention has shown excellent ionic conductivity.

Moreover, the lithium secondary battery utilizing the novel solid polymer electrolyte of the present invention has proved to show a high cell voltage and an excellent discharge voltage characteristic that are equal to those of a conventional, non-aqueous electrolyte lithium battery.

The foregoing excellent functions of the present invention result from the form of the solid electrolyte having the silylamide bonds (the Si—Na—Si bonds) in a polymer skeleton, or the form of the polymer formed by the polymerization of the mixture consisting of the organic compound having at least one carbon—carbon double bond and the lithium silylamide compound, so that they are not limited by other conditions different from those of the example and combinations thereof as far as they comply with the foregoing basic forms of the present invention.

In the example, a coin-type battery has been utilized, but it goes without saying that the present invention is also applicable to batteries of any shape and any size, including a pack-type battery, a button-type battery, a sheet-type battery, a stacked-type battery, a cylindrical battery, a flat battery, a rectangular battery and the like.

INDUSTRIAL APPLICABILITY

As described above, the present invention provides a solid polymer electrolyte which can readily be synthesized and has excellent mass productivity and high ionic conductivity, and provides a safe, lithium secondary battery comprising the solid polymer electrolyte and having excellent charge-discharge characteristics, so that it is not limited to use in compact electronic equipment such as a personal computer, a portable telephone and the like, and can find widespread use, for example, as a power source for an electric vehicle, a hybrid electric vehicle, an electric two-wheeled vehicle, an electric bicycle or the like, a backup power source for a domestic power storage system or a cogenerator, or the like.

What is claimed is:

1. A lithium secondary battery comprising a lithium ion conductive solid polymer electrolyte comprising a silylamide bond (a Si—N—Si bond) in a polymer skeleton.

2. The lithium secondary battery of claim 1, wherein said lithium ion conductive solid electrolyte is formed by the polymerization of a mixture consisting of an organic compound having at least one carbon—carbon double bond and a lithium silylamide compound.

3. The lithium secondary battery of claim 1, comprising a lithium ion conductive solid polymer electrolyte formed by the polymerization of a mixture consisting of an organic compound having at least one carbon—carbon double bond and a lithium silylamide compound, wherein the mixture is a prepolymer and is interposed between a positive electrode and a negative electrode for joining the electrodes together.

4. The lithium secondary battery of claim 1, comprising an electrode comprising a solid polymer electrolyte polymerized by the application of and drying of a mix comprising a mixture consisting of an organic compound having at least one carbon—carbon double bond and a lithium silylamide compound.

5. The lithium secondary battery of claim 2, comprising a lithium ion conductive solid polymer electrolyte formed by the polymerization of a mixture consisting of an organic compound having at least one carbon—carbon double bond and a lithium silylamide compound, wherein the mixture is a prepolymer and is interposed between a positive electrode and a negative electrode for joining the electrodes together.

6. The lithium secondary battery of claim 2, comprising an electrode comprising a solid polymer electrolyte polymerized by the application of and drying of a mix comprising a mixture consisting of an organic compound having at least one carbon—carbon double bond and a lithium silylamide compound.

7. The lithium secondary battery of claim 3, comprising an electrode comprising a solid polymer electrolyte polymerized by the application of and drying of a mix comprising a mixture consisting of an organic compound having at least one carbon—carbon double bond and a lithium silylamide compound.

8. The lithium secondary battery of claim 5, comprising an electrode comprising a solid polymer electrolyte polymerized by the application of and drying of a mix comprising a mixture consisting of an organic compound having at least one carbon—carbon double bond and a lithium silylamide compound.

\* \* \* \* \*